United States Patent [19]
Nagashima

[11] Patent Number: 5,423,593
[45] Date of Patent: Jun. 13, 1995

[54] LUMBAR SUPPORT DEVICE

[75] Inventor: Hideo Nagashima, Akishima, Japan

[73] Assignee: Tachi-S, Co., Ltd., Tokyo, Japan

[21] Appl. No.: 209,978

[22] Filed: Mar. 11, 1994

[51] Int. Cl.⁶ .............................................. A47C 7/02
[52] U.S. Cl. ............................... 297/284.4; 297/284.8
[58] Field of Search ............... 297/284.4, 284.2, 284.8, 297/452.3

[56] References Cited

U.S. PATENT DOCUMENTS

| | | |
|---|---|---|
| 4,880,271 | 11/1989 | Graves . |
| 5,044,693 | 9/1991 | Yokota ........................ 297/284.4 X |
| 5,076,643 | 12/1991 | Colasanti et al. . |
| 5,174,526 | 12/1992 | Kanigowski ................ 297/284.4 X |
| 5,197,780 | 3/1993 | Coughlin ..................... 297/284.4 X |
| 5,217,278 | 6/1993 | Harrison et al. . |
| 5,318,341 | 6/1994 | Griswold et al. ............ 297/284.4 X |

FOREIGN PATENT DOCUMENTS 227134 8/1969 Sweden ............................. 297/284.4

*Primary Examiner*—Laurie K. Cranmer
*Attorney, Agent, or Firm*—Oldham, Oldham & Wilson, Co.

[57] ABSTRACT

A lumbar support device for an automotive seat, which comprises a drive mechanism, a crank-like rod operatively connected to the drive mechanism, an elastic synthetic resin support plate, the upper part of which is movably secured to a seat back frame within a seat back of the seat, and a lumbar support portion defined in the lower part of the support plate. The lumbar support portion is formed in a cambered or forwardly curved shape. A forward and backward displacement of the support plate may be ajustably effected by the drive mechanism and crank-like rod to apply a pressure against the lumbar support area of foam cushion member of the seat back, and because of integral formation of both support plate and lumbar support portion, a gradual pressure gradient or distribution may be attained in the seat back cushion member, without creating a local non-pressure or extremely soft spot therein.

10 Claims, 2 Drawing Sheets

LUMBAR SUPPORT DEVICE

BACKGROUND OF INVENTION

1. Field of the Invention

The present invention relates to a lumbar support device in an automotive seat, and in particular to a lumbar support device which is provided in the seat back of automotive seat to support the lumbar part of an occupant sitting on the seat in order to alleviate his or her fatigue.

2. Description of Prior Art

Conventionally, a typical construction of lumbar support device in the seat back of automotive seat has been such that a lumbar plate is disposed movably between both lateral frame sections of a seat back frame, at a point corresponding to the lower area of the seat back suited for supporting the lumbar part of an occupant sitting on the seat, and that a drive mechanism is mounted on the seat back frame, the drive mechanism having a rod extending inwardly of the seat back frame, on which rod is provided that lumbar plate. Operation of the drive mechanism causes the lumbar plate to be moved forwardly and backwardly of the seat back frame via the rod. Thus, such movement of the lumbar plate gives and releases a pressure against a lumbar support area of foam cushion member in the seat back, so that the occupant may adjust the soft or hard cushiony degree of that particular lumbar support area to vary a support pressure of foam cushion member as desired against his or her lumbar part. This is disclosed, for instance, from the U.S Pat. Nos. 4,886,316 and 5,174,629

However, the lumbar plate itself is formed from a hard metallic plate and occupies small area relative to the whole area of frontal surface of the seat back. Consequently, the prior-art lumbar support device has been found defective in that the lower part of the foam cushion member is only applied a constant pressure by the flat surface of lumber plate, resulting in hardening only the lower lumbar support area of cushion member, without applying any pressure to other area of the cushion member than that lower lumbar support area , particularly an upper area of the same thereabove. Such non-pressed area of cushion member remains soft and raises the problem of unstable pressure distribution around the lumbar support area of seat back, for which reason, the occupant can not attain an optimal pressure distribution at the lumbar support area of seat back according to his or her own weight and has felt uncomfortable with this conventional lumbar support way.

SUMMARY OF THE INVENTION

In view of the above-stated drawbacks, it is therefore a primary purpose of the present invention to provide an improved lumbar support device which permits a lumbar support area of a seat back to support the lumbar part of a passenger fittingly according to his or her physique.

In order to achieve such purpose, a lumbar support device in accordance with the present invention basically comprises:
- a drive mechanism mounted on the seat back frame;
- a crank-like rod connected operatively to the drive mechanism, the crank-like rod being rotated by operation of the drive mechanism in a forward and backward direction with respect to the seat back frame;
- a support plate made of a synthetic resin material having an elastic property, which is smaller in size than the seat back frame;
- the support plate being attached at the upper portion thereof to the seat back frame in such a way as to be rotatively displaceable relative to the upper portion in a direction forwardly and backwardly of the seat back frame; and
- a lumbar support portion which is defined in a lower portion of the support plate corresponding to the crank-like rod, such as to extend transversely of the support plate in a forwardly arcuate manner.

Accordingly, a cushion member of the seat back may be adjustably given a gradual pressure gradient or distribution from the lumbar support area through such integral formation of the lumbar support portion and support plate, thereby eliminating such a local non-pressure or extremely soft area above and below the lumbar support area of cushion member that has been found in the prior art. Further, the forwardly curved or arcuate shape of the lumbar support portion is resiliently deformable into a reversely backward curvature to embracingly receive the slightly cambered surface of passenger's lumbar part in conformity therewith.

In one aspect of the invention, the upper portion of the support plate may be secured by a spring means to the upper portion of the seat back frame in order that such support plate upper portion may be free to displaced resiliently forwardly and backwardly of the seat back frame, without being confined to a fixed rotation center. Thus, the passenger can enjoy a comfortable support touch in the upper part of his or her back, as well.

Preferably, the support plate may be formed in such a configuration that conforms to the height-wise wavy surface of passenger's back, and provided with upper and lower flexible areas above and below the lumbar support portion, respectively, so as to give an optimal flexibility to the whole body of support plate, thereby fittingly supporting both passenger's lumbar part and back according not only to his or her own back shape but also to his or her own weight.

Another features and advantages of the present invention will become apparent from reading of the descriptions hereinafter with reference to the drawings.

DETAILED DESCRIPTION OF PREFERRED EMBODIMENT OF THE INVENTION

Referring to FIGS. 1 through 4, there is illustrated one preferred embodiment of lumbar support device (1) in accordance with the present invention.

Figure 1:
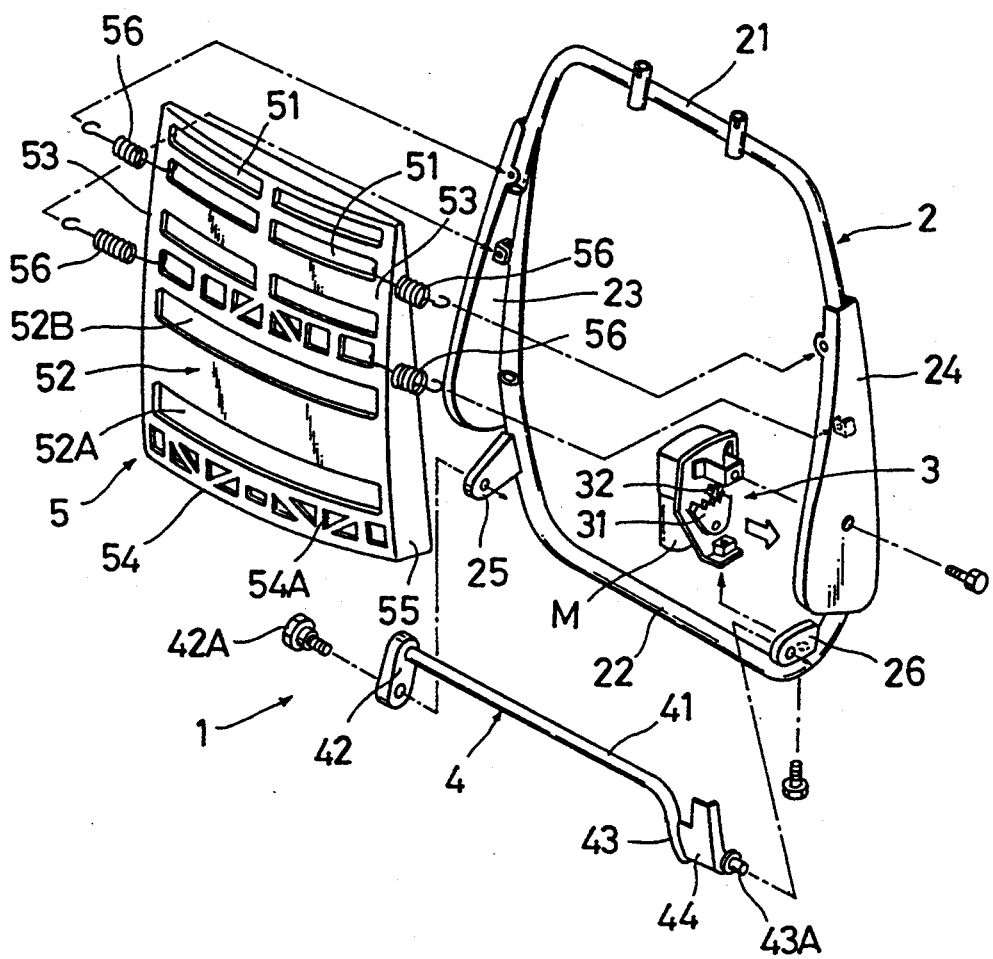
FIG. 1 is a schematic, exploded perspective view of a lumbar support device in accordance with the present invention.

Basically, as shown in FIG. 1, the lumbar support device (1) is comprised of a drive mechanism (3) mounted on a seat back frame (21), a crank-like rod (4) to be rotatively displaced by the drive mechanism (37 in a direction forwardly and backwardly of the seat back frame (21), and a support plate (5) having a lumbar support portion (52), which is disposed in the seat back frame (21) and contacted at its lumbar support portion (52) with the crank-like rod (4).

Figure 4:
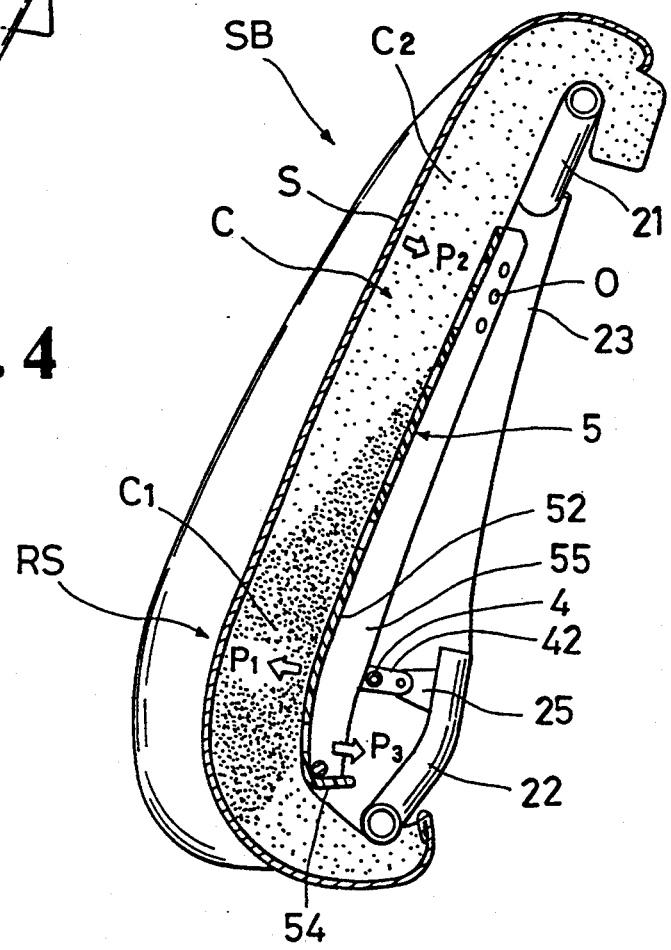
FIG. 4 is a longitudinally sectional view of a seat back of an automotive seat within which is provided the lumbar support device.

The seat back frame (2), which is provided within a foam cushion member (C) of a seat back (SB) as shown in FIG. 4, is formed by a generally inverted-U-shaped upper frame member (21), a generally U-shaped lower frame member (22), and a pair of right and left lateral plate members (23) (24), each being fixedly connected to the respective right-side lateral frame sections of the upper and lower frame members (21) (22) and to the respective left-side lateral frame sections thereof, as viewed from FIG. 1. The two lateral plate members (23) (24) project forwardly of the thus-formed generally rectangular shape of seat back frame (2).

Designations (25) (26) denote a pair of brackets which are fixed to the respective right-side and left-side lateral frame sections of lower frame member (22) in a manner erecting forwardly therefrom.

The crank-like rod (4) is essentially composed of a horizontal rod part (41), and a pair of lateral vertical rod parts (42) (43). As shown in FIG. 1, both lateral vertical rod parts (42) (43) of such rod (4) are rotatably connected to the two brackets (25) (26) by means of a bolt (42A) and a securing member (43A) integral with the right-side vertical rod part (43). Thus, the rod (4) extends transversely of the lower area of the seat back frame (2) which corresponds to the lumbar support portion (52) of the support plate (5) as will be explained later.

An actuation plate (44) is fixed on the right-side vertical rod part (43) of the crank-like rod (4).

The drive mechanism (3) comprises a motor (M), a pinion gear (32) fixed to an output shaft of the motor (M), and a sector gear (31) meshed with the pinion gear (32). These elements are mounted properly to the right-side lateral frame member (24), as viewed from FIG. 1, by means of a support bracket and bolts as shown in the same figure. Operation of the motor (M) causes rotation of the pinion gear (32), which in turn rotates the sector gear (31) in a direction forwardly and and backwardly with respect to the seat back frame (2). Though not shown, the motor (M) is connected electrically to a switch and may be controlled its drive in normal or reverse direction by operating the switch so as to execute the forward and backward rotation of sector gear (31).

Figure 3:
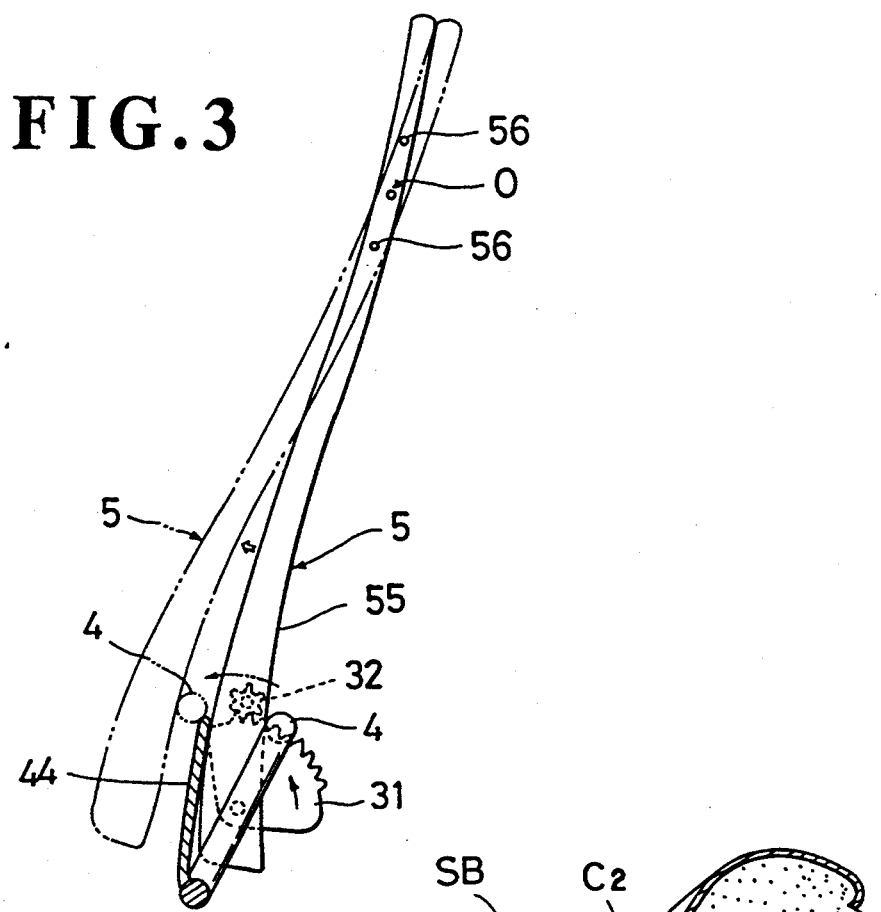
FIG. 3 is schematic side view of the lumbar support device, which explanatorily shows the displacement of the same.

As can be seen from FIGS. 1 and 3, the sector gear (31) of the drive mechanism (3) is so disposed as to be in contact with the actuation plate (44) of the crank-like rod (4). Therefore, the above-explained forward and backward rotation of the sector gear (31) is directly transmitted to that actuation plate (44), which causes the corresponding displacement of the lumbar support portion of support plate (5) as will be described below.

Description will now be made specifically of the support plate (5).

The support plate (5) is formed from such proper elastic yet robust material as a synthetic resin material (e.g. polypropylene) in a generally rectangular shape having a supporting surface to resiliently support the frontal surface area of foam cushion member (C) within the seat back (SB). The size of this support plate (5) is smaller than that of the seat back frame (2).

Figure 2:
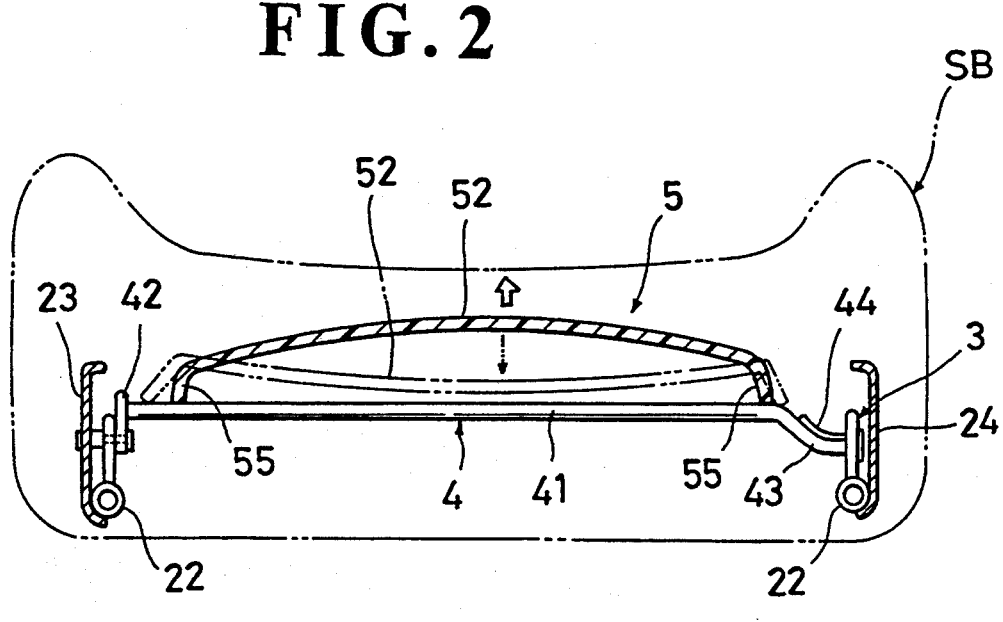
FIG. 2 is a partially sectional view of the lumbar support device provided in a seat back.

As best seen in FIG. 3, the support plate (5) is of a longitudinal sectional shape conforming to the heightwise wavy back shape of a passenger resting on the seat back (SB), and further, as seen in FIGS. 1, 2 and 4, the same support plate (5) is formed with an upper flexible area (53), the lumbar support portion (52) which is flexible too, a lower flexible area (54), and a rearwardly projected peripheral wall portion (55). In the illustrated embodiment, the upper flexible area (53) is provided with plural elongated openings (51) and the lower flexible area (54) is also provided with plural small openings (54A), to thereby give a desired flexibility to both of the two areas. The lumbar support portion (52) is shown as being defined between two spaced-apart elongated openings (52A) (52B) which are formed in the lower portion of the support plate (5), extending transversely thereof. Hence, such lumbar support portion (52) assumes a transverse integral bridge-like area extending transversely in the width-wise direction of support plate (5) at a point corresponding to the lumbar part of a passenger whose back rests on the frontal seat back (SB) or the support plate (5). With this arrangement, the lumbar support portion (52) per se is given a certain flexibility.

It is noted, as can be seen in all the drawings, that those flexible areas (51) (52) (54) are formed in a manner flexible forwardly and backwardly with respect to the body of support plate (5), and therefore they should preferably be so formed in general for the purpose of fittingly supporting the passenger's back in accordance with the gist of the present invention.

The above-constructed support plate (5) is attached over the frontal side of the seat back frame (2) such that both upper lateral portions of the plate (5) corresponding to the upper flexible area (51) are connected to the upper portions respectively of two lateral frame members (23) (24), by means of tension springs (56), while the lower point of the rearwardly projected lateral walls (52) thereof are contacted with the horizontal rod part (41) of crank-like rod (4), whereupon rotation of the crank-like rod (4) causes the support plate (5) to be swingingly or rotatatively displaceable relative to the center of rotation (0) in the fore-and-aft direction of the seat back frame (2). But, the rotation center (0) shown in the figure is just a reference point located around the tension springs (56), because actually the upper point of support plate is not fixed and slightly changeable from the rotation center (0) due to the elastic nature of tension springs (56).

In operation, when the motor (M) is driven in either a normal or reverse direction, the sector gear (31) is rotated forwardly or backwardly via the pinion (32), causing the corresponding forward or backward rotation of the actuation plate (44). This rotation of actuation plate (44) is transmitted through the simultaneous rotation of crank-like rod (4) to the lower portion of support plate (5), thereby causing the forward and backward rotative displacement of the support plate (5) with respect to the rotation center (0) as indicated in FIG. 3.

In the case where the support plate (5) is displaced forwardly of the seat back frame (2) by the normal drive of the motor (M), with particular reference to FIG. 4, the lower portion or particularly the lumbar support portion (52) of the support plate (5) is forwardly displaced to press the corresponding lower area (C1) of the foam cushion member (C) in the arrow direction (P1).

At this moment, that cushion member lower area (C1) is compressed to increase its density, hence rendering the same area hardened to provide a hard cushiony support pressure against the lumber part and other adjacent back part of a passenger. Further, more importantly, since the lumbar support portion (52) is integral and continuous with other upper and lower flexible areas (51) (54) in the support plate (5), the lumbar support device (1) in the present invention offers a proper distribution of support pressure around the lumbar support portion (42) as indicated by such finely doted region (at C1) in FIG. 4. It is thus observed that the support pressure is most high at a point corresponding to the lumbar support portion (52), and gradually decreased therefrom as it proceeds towards the upper area (C2) of cushion member (C) where its density becomes lower as indicated by the roughly dotted region (at C2). In addition, the lumbar support portion (52) is of a camber or forwardly arcuate cross-section, as shown in FIG. 2, which can be resiliently flexed in the backward direction as indicated by the two-dot chain line with respect to the body of support plate (5), thereby presenting an optimal curvature of support surface to embracingly receive the slightly cambered surface of passenger's lumbar part in conformity therewith. Still further, the upper portion of support plate (5), by the reason of its being secured by the tension springs (56) to the seat back frame (2), is not confined to the rotation center (0) but free to be displaced resiliently in the fore-and-aft direction with respect to the seat back frame (2), so that the pressure distribution there is more finely variable in cooperation with the aforementioned gradual pressure gradient or distribution from the lumbar part area, and a passenger can therefore feel an optimal support touch in accordance with his or her own weight and upper body constitution. Yet still further, the upper and lower flexible areas (53) (54) of support plate (5) serve to properly retain the above-stated gradual pressure distribution or gradient along the height-wise wavy sectional shape of passenger's back even when the corresponding upper and lower points of passenger's back exert such upper and lower pressures (P2) (P3) upon the cushion member (C) as indicated in FIG. 4.

Accordingly, with the foregoing features in combination, it is appreciated that when a passenger sits on a seat with the seat back (SB), he or she firstly feels a comfortably fitting support on the seat back because the above-described flexible structure of support plate (4) effectively supports the passenger's back along its contour or outer shape, and further when operating the lumbar support device (1) to apply a pressure (F1 in FIG. 4) to his or her lumbar part, the corresponding and other adjacent areas (C1 and C2) of foam cushion member (C) is given a gradual pressure gradient by virtue of the frontal support surface of support plate (5) as explained earlier with reference to FIG. 4, which eliminates a local non-pressure or extremely soft area above and below the lumbar support area (C1) within cushion member (C) and therefore the passenger can enjoy a stable back supporting touch on the seat back (SB). At the same time, the lumbar support portion (52) is resiliently flexed in the backwardly arcuate way as in FIG. 2 to embracingly and softly receive the passenger's lumbar part along the slight outward curved surface thereof, and furthermore, the free fore-and-aft elastic movability of the upper end portion of support plate (5) due to the tension springs (56) as well as the provision of upper and lower flexible areas (51) (54) in the support plate (5) help to automatically make a fine adjustment of cushiony support degree of foam cushion member (C) on the whole in conjunction with the gradual pressure distribution effects of the body of support plate (5), so as to provide a sufficient fitting and receiving touch to the whole back surface of passenger along his or her individual upper body physique and according to his or her individual weight.

While having described the present invention as above, it should be understood that the invention is not limited to the illustrated embodiment, but any other modifications, replacements and additions may be applied thereto structurally without departing from the scopes of the appended claims. For example, the support plate (4) may be so formed as to assume the same forwardly arcuate or curved cross-section with that of the lumbar support portion (52).

What is claimed is:

1. A lumbar support device for an automotive seat, which the seat includes a seat back and a seat back frame provided in the seat back, said lumbar support device comprising:

a drive mechanism mounted on said seat back frame;

a crank-like rod connected operatively to said drive mechanism, said crank-like rod being rotated by operation of said drive mechanism in a forward and backward direction with respect to said seat back frame;

a support plate made of a synthetic resin material having an elastic property, which is smaller in size than said seat back frame;

said support plate being attached, at the upper portion thereof, to said seat back frame in such a manner as to be rotatively displaceable by said crank-like rod relative to said upper portion in a direction forwardly and backwardly of said seat back frame; and a lumbar support portion which is defined in a lower portion of said support plate corresponding to said crank-like rod, such as to extend transversely of the support plate in a forwardly arcuate manner, wherein said crank--like rod includes a horizontal rod part extending in a direction transversely of said seat back frame, and wherein said horizontal rod part is contacted with a rearwardly projected peripheral lateral wall portion of said support plate.

2. The lumbar support device according to claim 1, wherein said seat back includes a foam cushion member and wherein said foam cushion member is supported by said support plate and a support pressure may be varied in a lower area of said foam cushion through said support plate by operation of said drive mechanism so as to attain a proper pressure degree against a lumbar part of a passenger sitting on the seat.

3. The lumbar support device according to claim 1, wherein a spring means is provided between the upper portion of said seat back frame and said support plate.

4. The lumbar support device according to claim 1, wherein said synthetic resin material is a polypropylene, and wherein said support plate is formed with a plurality of openings therein in order to give a proper flexibility thereto.

5. The lumbar support device according to claim 1, wherein said support plate is integrally formed with a lower flexible area at a point below said lumbar support portion.

6. The lumbar support device according to claim 1, wherein said drive mechanism comprises a drive source, a pinion gear fixed to said drive source, and a sector gear meshed with said pinion gear, wherein said crank-like rod includes an actuation plate means with which said sector gear is contacted.

7. A lumbar support device for an automotive seat, in which the seat includes a seat back and a seat back frame provided in the seat back, said lumbar support device comprising:

a support plate made of a synthetic resin material having an elastic property, said support plate being smaller in size than said seat back frame and attached thereto at the upper portion thereof, said support plate having, formed at a reverse side thereof, a rearwardly projected peripheral lateral wall portion;

said support plate being so formed as to have such a configuration in section which conforms to a surface of a back of a passenger;

a lumbar support portion which is defined in a lower portion of said support plate such as to extend transversely thereof in a forwardly arcuate manner;

a drive mechanism mounted on said seat back frame; and a crank-like rod which is so operatively connected to said drive mechanism that operation of said drive mechanism causes said crank-like rod to be rotated forwardly and backwardly with respect to said seat back frame, said crank-like rod having a part that contacts said rearwardly projected peripheral lateral wall portion of said support plate in correspondence with said lumbar support portion, wherein said support plate is rotatively displaceable by said crank-like rod relative to said upper portion in a direction forwardly and backwardly of said seat back frame and said lumbar support portion, when it is applied a load from said back of the passenger, may be elastically deformed from its forwardly arcuate state to a backwardly arcuate state to embracingly receive a lumbar part of the passenger in conformity therewith.

8. The lumbar support device according to claim 7, wherein said seat back includes a foam cushion member and wherein said foam cushion member is supported by said support plate and a support pressure may be varied in a lower area of said foam cushion through said support plate by operation of said drive mechanism so as to attain a proper pressure degree against a lumbar part of a passenger sitting on the seat.

9. A lumbar support device for an automotive seat, in which the seat includes a seat back and a seat back frame provided in the seat back, said lumbar support device comprising:

a support plate made of a synthetic resin material having an elastic property, said support plate being smaller in size than said seat back frame and attached thereto at the upper portion thereof, said support plate having, formed at a reverse side thereof, a rearwardly projected peripheral lateral wall portion;

said support plate being so formed as to have such a configuration in section which conforms to a surface of a back of a passenger;

a lumbar support portion which is defined in a lower portion of said support plate such as to extend transversely thereof in a forwardly arcuate manner;

said support plate being further so formed as to assume a same forwardly arcuate shape with that of said lumbar support portion;

a drive mechanism mounted on said seat back frame; and a crank-like rod so operatively connected to said drive mechanism that operation of said drive mechanism causes said crank-like rod to be rotated forwardly and backwardly with respect to said seat back frame, said crank-like rod having a part that contacts said rearwardly projected peripheral lateral wall portion of said support plate in correspondence with said lumbar support portion, wherein said support plate is rotatively displaceable by said crank-like rod relative to said upper portion in a direction forwardly and backwardly of said seat back frame and both said support plate and lumbar support portion, when they are applied a load from a back of a passenger, may be elastically deformed from their forwardly arcuate state to a backwardly arcuate state to embracingly receive both lumbar part and back of the passenger in conformity therewith.

10. The lumbar support device according to claim 9, wherein said seat back includes a foam cushion member and wherein said foam cushion member is supported by said support plate and a support pressure may be varied in a lower area of said foam cushion through said support plate by operation of said drive mechanism so as to attain a proper pressure degree against a lumbar part of a passenger sitting on the seat.

* * * * *